United States Patent [19]

Lu

[11] Patent Number: 4,713,713

[45] Date of Patent: Dec. 15, 1987

[54] CLEANING TAPE CARTRIDGE USED IN VIDEOTAPE RECORDERS

[76] Inventor: Siat-Ling Lu, No. 6, Alley 27, Lane 629, Nei-Hu Road, Taipei, Taiwan

[21] Appl. No.: 731,735

[22] Filed: May 8, 1985

[51] Int. Cl.$^4$ .............................................. G11B 5/10
[52] U.S. Cl. ............................ 360/128; 15/DIG. 12
[58] Field of Search ............................ 360/128, 137; 15/DIG. 12–DIG. 13

[56] References Cited

FOREIGN PATENT DOCUMENTS 0123124 10/1984 European Pat. Off. ............ 360/128
3212730 9/1983 Fed. Rep. of Germany ...... 360/128

Primary Examiner—A. J. Heinz
Attorney, Agent, or Firm—Sandler & Greenblum

[57] ABSTRACT

A tape cleaning cartridge is provided which has a take-up reel and a tape supply reel. The cartridge also includes a cleaning solution holding container having a compressible end and a tubing attached to an opposed side wall of the container. The tubing has a free end which pierces a cotton ball, and the cartridge is capable of intermittently supplying uniform amounts of cleaning solution to the cotton ball to be applied to a tape which traverses a path through the cartridge. In this fashion, the tape can then be used to adequately clean the magnetic head of a videotape recorder.

10 Claims, 2 Drawing Figures

CLEANING TAPE CARTRIDGE USED IN VIDEOTAPE RECORDERS

BACKGROUND OF THE INVENTION

1. Technical Field of the Invention

The present invention generally relates to cleaning tapes, and more specifically to a cleaning tape or cartridge which cleans the magnetic head of a videotape recorder. The cleaning tape of the present invention is put directly into the seat or area in a videotape recorder which is adapted to receive the magnetic tape, and the tape is used to clean the magnetic head of the recorder.

2. Discussion of the Prior Art

Previously, cotton sticks and cleaning solutions have been used to clean the magnetic head of a videotape recorders. Cartridge type cleaning tapes have also been used to clean the magnetic heads; these which are easier to use than such sticks and cleaning solution. Conventional cleaning type cartridge tapes have the same basic structure as the conventional type of tape used to generate a video frequency signal in a videotape recorders. Between the upper and lower cartridge bodies in a conventional cleaning cartridge, a cleaning tape is built which is capable of winding and running, and which is wound about two reels or discs in the body of the cartridge. Such cartridge type cleaning tapes have been widely used for cleaning the magnetic heads of videotape recorder. The path for cleaning tapes begins about a turning shaft which includes the cleaning solution, so that after the tape is put into the magnetic tape cartridge seat of a videotape recorder, the cartridge contacts the magnetic head by pressing "play" on the videotape recorder. Such motion causes the cleaning tape to automatically clean the magnetic head.

The above-noted types of cleaning tape cartridges are defective and disadvantageous for several reasons. They do not facilitate cleaning of the magnetic head and do not clean as efficiently as does the present invention. The structure of conventional cleaning tapes is designed so that a turning shaft containing the cleaning solution within the cartridge body will contact the cleaning tape to form intermittent wet or dry sections for cleaning the magnetic head. This type of cleaning tape cartridge involves the installation of cleaning felt within a hollow portion of the turning shaft; the placement of cleaning solution on the felt would cause the portion of the cleaning felt which is exposed along the exterior edge of the turning shaft of the cleaning tape, to thus volatilize and dry out the cleaning solution thereon. Additionally, because the turning shaft has a minimal amount of interior space, it cannot contain a desirably large amount of cleaning solution. Thus, it is necessary to frequently refill the cleaning solution located in the interior of the turning shaft. Further, because the turning shaft is not sufficiently stable when it rotates at a high speed or for a relatively long time, the support portion between the cartridge body is subjected to friction, and therefore to being inclined or bent. Alternately, when the cleaning solution within the turning shaft is used up or dry, winding and running of the cleaning tape would immediately cause destructive friction against the magnetic head of the videotape recorder. The biting caused by the turning shaft, or the drying up of the cleaning solution within the rotating shaft, cannot be easily detected from the exterior of the cartridge body, and is therefore not helpful in avoiding damage to the tape and/or to the recorder. In other words, there is no way for a user to detect the absence of cleaning fluid or the destruction of the tape by the shaft due to friction or biting, and thus the possibility of damaging the magnetic head of the videotape recorder is substantially increased using such known cleaning cartridges.

SUMMARY OF THE INVENTION

Accordingly, it is a general object of the present invention to provide a new and improved cleaning tape cartridge for use with a videotape recorder which minimizes damage to the magnetic head of the recorder and which facilitates cleaning of the magnetic head.

The present type utilizes the rotary driving force of a reel or disc which is wound with cleaning tape to press against a container containing cleaning solution which is inserted into the body of the cartridge. This, in turn, causes the cleaning solution in the container, dependent upon the winding and running speed of the cleaning tape, to intermittently dispense equal amounts into the front end of the container and through a catheter tubing to a cotton ball which abuts and contacts the cleaning tape, all of this resulting from the application of an elastic force exerted by the catheter. This makes the cleaning tape receive even amounts of cleaning solution while it is being wound on a take-up reel and while it runs, and also automatically wipes the magnetic head to remove dust, magnetic powder, or similar dirt attached to the magnetic head. This, in turn, maintains the videotape recorder in optimal service condition and extends the useful life of the magnetic head. A cleaning tape used in accordance with the present invention thus provides numerous advantages in comparison to the cleaning tape cartridges known in the prior art.

The present invention is provided for in a first aspect thereof by a cleaning tape cartridge adapted to be inserted into a videotape recorder to clean the magnetic head of the recorder, the cleaning tape cartridge comprising a cleaning tape adapted to traverse a path through said cartridge. The supply (or winding) reel is located adjacent a first end of the tape traversing path, the tape being adapted to be unwound from the supply reel. A take-up reel is located adjacent a second end of said tape traversing path, said tape adapted to be wound about said take-up reel. A container comprising cleaning solution and means for conducting the cleaning solution from the container to said tape are provided; and solution is applied to the tape in even amounts when it is unwound from the supply reel.

The cleaning tape cartridge includes means for conducting cleaning solution from the container and for applying solution tape the tape rotates about the supply reel. A flexible tube or catheter having a first end attached to said container and a second end which is attached to a cotton ball delivers the solution to the ball. The cotton ball abuts the tape and is adapted to supply fluid in even amounts to tape as the tape is unwound from supply reel.

The solution container has a lower end with a dispensing opening into which a plug is detachably inserted.

The cleaning container further comprises a compressible portion located on a second side wall of said container which is opposed from the first side wall of said container, to which the tubing is attached, compressible portion comprising means for forcing said solution from said container, through an opening in the first container sidewall, through the tubing, and into said cotton ball.

The tubing is preferably formed from elastic material, and its second end comprises a clip on which cotton ball is secured.

The take-up reel has a plurality of spaced projections around its periphery; and the cartridge further comprises a substantially L-shaped activating and guide bar which is adapted to compress the compressible portion of the container when the take-up reel rotates. The guide bar has a first end which is adapted to be hit by the projections on the take-up reel and a second end which is adapted to abut the compressible portion of said container.

In a second aspect, the present invention provides a cleaning tape cartridge adapted to clean the magnetic head of a videotape recorder by being inserted into the cassette cartridge receiving portion of the videotape recorder. The cleaning tape cartridge comprises a substantially rectangular casing and a substantially circular supply reel having a plurality of projections and located adjacent a first end of a cleaning tape traversing path within the casing.

A take-up reel is located adjacent a second end of the cleaning tape traversing path; the take-up reel has a generally circular periphery and a plurality of spaced projections located about the periphery.

A cleaning solution holding container is located between the supply reel and the take-up reel. The container has a top wall, first and second opposed sidewalls, and a bottom wall. The bottom wall has an opening for receiving and dispensing cleaning solution therethrough, and a detachable sealing plug is adapted to be inserted into the opening. Tubing is attached to an opening in the first sidewall of the container and has first and second ends. The first tubing end is attached to an opening in the first container sidewall, and a second end comprising a clip on which a cotton ball is attached. The cotton ball substantially abuts the exterior periphery of the supply reel. The container further comprises a compressible portion positioned along the second sidewall of the container. The compressible portion is adapted to be compressed to force cleaning solution through the opening in the first sidewall of the container, through the catheter tubing, and onto the cotton ball in order to dispense uniform amounts of cleaning solution onto the tape as it traverses that portion of the tape traversing path defined by the supply reel. A substantially L-shaped guide and activating bar has first and second ends. The first end of the guide bar is adapted to be hit by the take-up reel projections in an intermittent fashion when the take-up reel is rotated. A second end of the guide bar abuts the compressible portion of the container and is adapted to compress said compressible portion when the first end of said L-shaped guide bar is hit by one of said projections on the take-up reel.

BRIEF DESCRIPTION OF THE DRAWINGS

The above and other objects, features and advantages of the present invention will become more fully apparent to those of ordinary skill in the art to which this invention pertains from the following detailed description, taken in conjunction with the accompanying drawings, in which like reference numerals are used to identify similar parts throughout, and wherein.

DETAILED DESCRIPTION OF THE DRAWINGS

Referring more specifically to the drawings, the invention as illustrated comprises a cleaning tape cartridge which is adapted to be directly inserted into the magnetic tape cartridge seat of a conventional videotape recorder. The cartridge is adapted to clean the magnetic head of the video recorder by using the play button or key of the video recorder and by winding and running a cleaning tape through the cleaning tape cartridge to automatically and efficiently clean the magnetic head of the videotape recorder.

A cleaning tape cartridge formed in accordance with the present invention utilizes the turning drive or motive force of the reels or discs of cleaning tape which are rotatably positioned within a conventional cartridge body. This is used to compress a cleaning solution holding container which is inserted into the cartridge. The cleaning solution container repeatedly supplies equal amounts of cleaning solution to a cotton ball which abuts the cleaning tape. The cotton ball is always maintained with adequate humidity so that the cleaning tape which is being wound and run through the cartridge evenly receives cleaning solution and supplies the cotton ball with equal amounts of cleaning solution. When the tape traverses the magnetic head of the recorder, it wipes the head to remove dust, magnetic powder and other dirt attached on the head in order to extend the useful service life of the magnetic head and to protect it from damage. The container will hold a relatively large amount of cleaning fluid, which to minimizes or eliminates problems due to in the rapid consumption of the fluid or drying up of the cleaning solution, which occurred in the prior art. Thus, there is no need to frequently open the cartridge to refill the cleaning solution. Because the present apparatus is designed to use a cotton ball located at the front end of the container to contact the cleaning tape, it is not necessary to additionally install a rotatable cleaning shaft within the cartridge body. Thus, the friction, inclination and biting caused by the turning shaft of the prior art are eliminated, thus increasing the useful service life of the cleaning tape cartridge and of the head which is being cleaned. Further, because the cotton ball which contains the cleaning solution always maintains suitable contact with the cleaning tape, when the reel disc turns to wind and run the tape, the cleaning solution will pass through the cotton ball in an even fashion and uniformly be applied to the cleaning tape. Thus, the surface of the cleaning tape always maintains an even quantity of humidity, thereby increasing the wiping and cleaning capacity which it can provide to the magnetic head of the videotape recorder which it is being used to clean.

Figure 1:
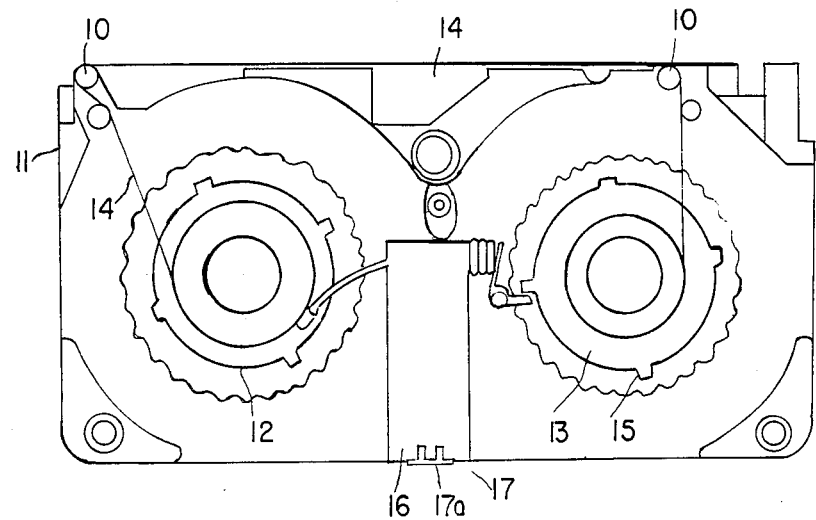
FIG. 1 is a plan view of a cartridge formed in accordance with the present invention, with its top removed.

As illustrated in FIG. 1, winding or supply reel 12, and take-up reel or disc 13, are provided in cartridge body 11. The cleaning tape is adapted to pass over a plurality of guide wheels 10, over reel 12, about which the cleaning tape 14 is wound through the front edge of the cartridge, over a second plurality of guide wheels 10, and onto take-up disc 13. This comprises the cartridge traversing path of the cleaning tape. A single container 16 having a desirably large amount of cleaning solution therein is inserted into cartridge body 11 through the bottom wall of the cartridge. The container includes an inlet aperture 17 which has a removable plug 17a, which can be removed at the bottom of cartridge 11 to refill the container or drain cleaning solution therefrom.

Figure 2:
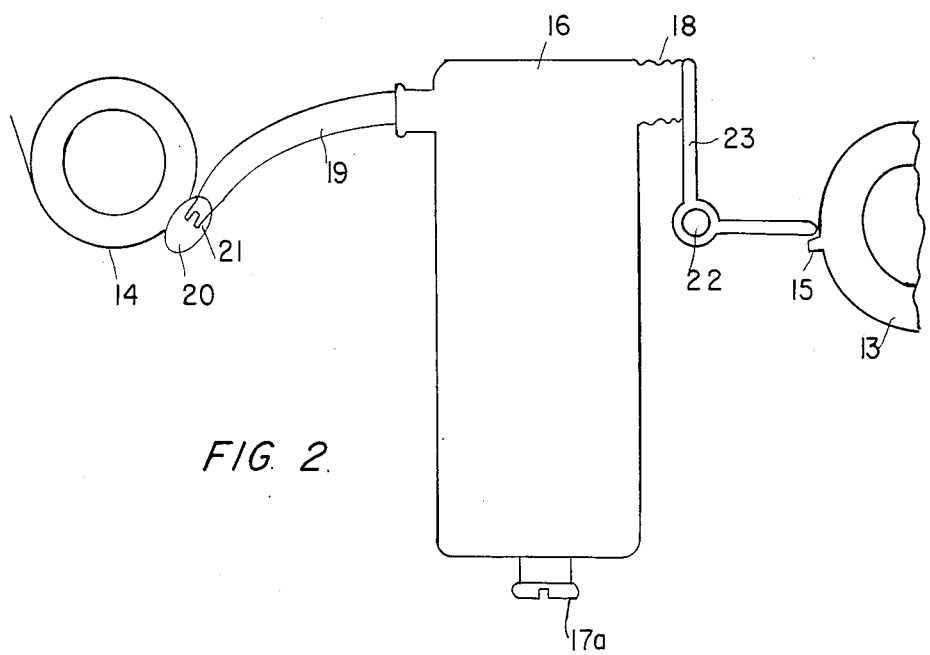
FIG. 2 illustrates in detail the cleaning solution container, the catheter, the reel/tape contacting cotton ball, and the take-up winding, i.e., supply, reels of the cartridge of FIG. 1.

As illustrated in FIG. 2, the upper right hand portion of the cleaning solution container 16 includes an annular portion 18 which can be compressed. At the upper left hand portion of the container, as viewed in the figures, an appropriate length of catheter tubing 19 which extends from an opening 25 in the upper left hand portion of the first container sidewall extends and terminates at a dispensing opening 21. A cotton ball 20 is clipped onto the dispensing opening at the end of the tubing, and the natural elasticity of the catheter causes the cotton ball to contact the cleaning tape 14 as it surrounds the winding reel 12. The catheter can be formed from rubber or similar material as long as it has the desirable natural elasticity to exert pressure to contact reel 14 with the wetted ball 20.

The external rim of take-up disc 13 has a plurality of prongs, projections or bulges 15 which are spaced around the periphery of the take-up wheel at equal angular distances from each other. As illustrated in FIG. 2, an axial stud 22 is located near the center of a generally L-shaped guide bar; the bar contacts the periphery of take-up reel 13 at one end, and at its other end abuts the compressible annular portion 18 of container 16. As take-up disc 13 rotates to wind cleaning tape thereon, projections 15 on the take-up disc periphery or rim will move uniformly, and will abut or contact the one end of L-shaped guide bar 23. This serves to force the other end of bar 23 to repeatedly compress annular portion 18 of the container inwardly towards the upper side portion of the container. This motion will, in turn, cause the cleaning solution within container 16 to evenly and uniformly fill the catheter, and hence cotton ball 20. This enhances the even application of fluid onto the cleaning tape which is running about, i.e., being unwound from, winding reel 14.

The annular compressible portion 18 of container 16 exerts a rebound force after it is pressed by bar 23. When this portion is pressed, the container will serve to press out an appropriate amount of cleaning fluid from catheter 19. When it is not pressed, the annular portion will automatically rebound and recover into a natural saturating situation.

Such structure serves to provide a cleaning tape cartridge which contains a suitable amount of cleaning solution which will not dry up or volatilize. The sophisticated design of the present cleaning tape causes cleaning solution to be applied in even, equal and uniform amounts to the cleaning tape and automatically wipes the magnetic head. This is contrary to the function and structure of conventional cleaning tapes, in which it is necessary to unload the cartridge body to check for maintenance and to refill cleaning solution. The present tape, further to the contrary, includes no components which will frictionally engage or otherwise damage the magnetic head of the videotape recorder. This will increase the useful service life of the videotape recorder as discussed previously.

From the above description, it is apparent that other embodiments of the present invention are within the scope of those of ordinary skill in the art to which this invention pertains, and that this invention equally well covers such embodiments.

What is claimed is:

1. A cleaning tape cartridge adapted to be inserted into a videotape recorder to clean the magnetic head of said recorder, said cleaning tape cartridge comprising:
    (a) a cleaning tape adapted to traverse a path through said cartridge;
    (b) a tape supply reel located adjacent a first end of said tape traversing path, said tape adapted to be unwound from said supply reel;
    (c) a take-up reel located adjacent a second end of said tape traversing path, said tape adapted to be wound about said take-up reel; and
    (d) a container adapted to contain cleaning solution, means for conducting said cleaning solution from said container, and means for applying said solution to said tape in even amounts as said tape is unwound from said supply reel, wherein said means for conducting said cleaning solution from said container and said means for applying said solution to said tape includes tubing having a first end attached to a first side wall of said container, said tubing having a second end which is attached to a liquid applicator, said liquid applicator abutting said tape on said supply reel and comprising means for applying said solution in even amounts to said tape as it is unwound from said supply reel, said cleaning container further comprising a second side wall and a compressible portion located on said second side wall, opposite to said first side wall of said container to which said tubing is attached, said compressible portion comprising means for forcing said liquid solution from said container, through said tubing and into said applicator, said device further comprising a pivotable guide bar which is pivoted during rotation of said take-up reel and which includes means for compressing said compressible portion of said container when said take-up reel rotates.

2. A cleaning tape cartridge in accordance with claim 1 wherein said applicator comprises a cotton ball.

3. A cleaning tape cartridge in accordance with claim 2 wherein said solution container has a lower end with a dispensing opening, said cartridge further comprising a plug detachably inserted into said opening.

4. A cleaning tape cartridge in accordance with claim 3, wherein said take-up reel has a plurality of spaced projections around its periphery, and wherein said guide bar is substantially L-shaped.

5. A cleaning tape cartridge in accordance with claim 3 wherein said tubing is formed from an elastic material.

6. A cleaning tape cartridge in accordance with claim 5 wherein said second end of said tubing comprises a clip on which said cotton ball is secured.

7. A cleaning tape cartridge in accordance with claim 1 wherein said container comprises cleaning solution.

8. A cleaning tape cartridge adapted to be inserted into a videotape recorder to clean the magnetic head of said recorder, said cleaning tape cartridge comprising:
    (a) a cleaning tape adapted to traverse a path through said cartridge;
    (b) a tape supply reel located adjacent a first end of said tape traversing path, said tape adapted to be unwound from said supply reel;
    (c) a take-up reel located adjacent a second end of said tape traversing path, said tape adapted to be wound about said take-up reel; and
    (d) a container adapted to contain cleaning solution and means for conducting said cleaning solution from said container and for applying said solution to said tape in even amounts as said tape is unwound from said supply reel, said means for conducting said cleaning solution from said container and for applying said solution to said tape including tubing, said tubing having a first end attached to a first side wall of said container and said tubing having a second end which is attached to an applicator, said applicator abutting said tape on said supply reel and adapted to apply said solution in even amounts to said tape as it is unwound from said supply reel, said solution container having a lower end with a dispensing opening, said cartridge further comprising a plug detachably inserted into said opening, said cleaning container further comprising a compressible portion located on a second side wall of said container which is located oppositely from said first side wall of said container to which said tubing is attached, said compressible portion comprising means for forcing said solution through said tubing and into said applicator, said take-up reel having a plurality of spaced projections located about its periphery, wherein said device further comprises a substantially L-shaped guide bar which comprises means for compressing said compressible portion of said container when said take-up reel rotates, wherein said generally L-shaped guide bar has a first end which is adapted to be hit by said projections on said take-up reel, and a second end which is adapted to abut said compressible portion of said container.

9. A cleaning tape cartridge in accordance with claim 8 wherein said container comprises cleaning solution.

10. A cleaning tape cartridge adapted to clean the magnetic head of a videotape recorder by being inserted into the cassette cartridge receiving portion of said videotape recorder, said cleaning tape cartridge comprising:
(a) a substantially rectangular casing;
(b) a substantially circular supply reel having a plurality of projections and located adjacent a first end of a cleaning tape traversing path within said casing;
(c) a take-up reel located adjacent a second end of said cleaning tape traversing path, said take-up reel having a generally circular periphery and a plurality of spaced projections located about said periphery;
(d) a cleaning solution holding container located between said supply reel and said take-up reel, said container having a top wall, first and second opposed sideswalls, and a bottom wall, said bottom wall having an opening for receiving and dispensing cleaning solution therethrough, a removable plug being detachably positioned within said opening, said device further comprising tubing attached to an opening in said first container sidewall, said tubing having first and second ends, said first tubing end being attached to said opening in said first container sidewall, said second tubing end comprising a clip on which a cotton ball is attached, said cotton ball abutting the exterior periphery of said supply reel, said container further comprising a compressible portion positioned on said second sidewall of said container, said compressible portion adapted to be compressed for force cleaning solution from said container, through said opening in said first side wall of said container, through said tubing, and onto said cotton ball in order to dispense uniform amounts of cleaning solution onto said tape as it traverses that portion of the tape traversing path defined by said supply reel; and
(e) a substantially L-shaped guide bar, said guide bar having first and second ends, said first end of said guide bar adapted to be hit by said take-up reel projections in an intermittent fashion when said take-up reel is rotated, said second guide bar end abutting said compressible portion of said container and being adapted to compress said compressible portion of said container when said first end of said L-shaped guide bar is hit by one of said projections on said supply reel.

* * * * *

UNITED STATES PATENT AND TRADEMARK OFFICE
CERTIFICATE OF CORRECTION

PATENT NO. : 4,713,713
DATED : December 15, 1987
INVENTOR(S) : Siat-Ling LU

It is certified that error appears in the above-identified patent and that said Letters Patent is hereby corrected as shown below:

At column 1, line 16, delete "a" before "videotape";
column 1, line 22, delete "a" before "videotape";
column 1, line 29, change "recorder" to ---recorders---;
column 2, line 13, change "type" to ---tape---;
column 4, line 36, delete "to"; and
column 8, line 12, change "sideswalls to ---sidewalls---.

Signed and Sealed this

Sixth Day of September, 1988

*Attest:*

DONALD J. QUIGG

*Attesting Officer*  *Commissioner of Patents and Trademarks*